United States Patent [19]
Sato

[11] 3,876,686
[45] Apr. 8, 1975

[54] METHOD OF PREVENTING THE POLYMERIZATION OF LIQUID VINYL MONOMER

[75] Inventor: Ryozi Sato, Yokohama, Japan
[73] Assignee: The Japanese Geon Company, Ltd., Tokyo, Japan
[22] Filed: Mar. 30, 1971
[21] Appl. No.: 129,573

[30] Foreign Application Priority Data
Apr. 1, 1970 Japan.................................. 45-26970

[52] U.S. Cl............................................. 260/486 R
[51] Int. Cl............................................ C07c 69/54
[58] Field of Search ................................ 260/486 R

[56] References Cited
UNITED STATES PATENTS
2,446,984  8/1948  Rogers et al........................ 260/486

FOREIGN PATENTS OR APPLICATIONS
567,130  1/1945  United Kingdom............. 260/486 R

*Primary Examiner*—Lorraine A. Weinberger
*Assistant Examiner*—Paul J. Killos
*Attorney, Agent, or Firm*—Sherman & Shalloway

[57] ABSTRACT

A method of preventing the polymerization of a liquid vinyl monomer selected from the group consisting of acrylic acid esters, methacrylic acid esters or mixtures thereof, which comprises adding to the monomer, as a polymerization inhibitor, hexamethylenetetramine, in an amount sufficient to inhibit polymerization.

8 Claims, No Drawings

METHOD OF PREVENTING THE POLYMERIZATION OF LIQUID VINYL MONOMER

The present invention is concerned with the stabilization of acrylic acid esters, methacrylic acid esters or mixtures thereof, that is, a method of preventing the polymerization.

Acrylic acid esters and methacrylic acid esters (hereinafter referred to simply as monomer or monomers) are well known as very useful compounds. On the other hand, however, it is also known that these monomers are unstable compounds which are liable to cause the polymerization with ease by virtue of heat, light, peroxide, etc. Consequently, in the carrying out of the purification, storage and transportation of these monomers, it goes without saving that one should take measures to inhibit polymerization in order to remove possible troubles, such as clogging and contamination of apparatus caused by the precipitation of polymerized products followed by interruption of operation or loss of the compounds concerned.

Conventionally, polymerization inhibitors used in such cases include, for instance, hydroquinone, hydroquinone derivatives or phenol derivatives, etc. However there are drawbacks with these stabilizers in that they do not exhibit stabilization effects sufficiently when the aforesaid monomers are exposed particularly to elevated temperatures. Further, if these stabilizers are present in the polymerization system in the production of useful polymers by the polymerization of monomers, it gives rise to unfavorable effects such that the polymerization time is remarkably delayed, the catalyst is wasted in excess amounts as compared with the case under the usual polymerization conditions and reproducibility of the polymerization is lowered, causing unfavorable influences upon the polymerization yields, molecular weight distribution, etc., or polymers are colored.

Consequently, when polymerizing acrylic acid esters or methacrylic acid esters stabilized by the aforesaid conventional polymerization inhibitors, it was necessary to provide in advance a process for the removal of inhibitors in accordance with a method such as distillation, extraction and adsorption and disadvantages caused therefrom, e.g., increased cost of expenditure for the installation of equipment therefor and loss of monomers were not of negligible nature.

The object of the present invention is to provide an effective method for preventing the polymerization of acrylic acid esters or methacrylic acid esters, or mixtures thereof by the discovery of a stabilizer free from the aforesaid drawbacks.

Other objects of the present invention will be obvious from the statement given below.

In accordance with the present invention, in the case of adding hexamethylenetetramine to acrylic acid esters or methacrylic acid esters or mixtures thereof, monomers are sufficiently stabilized not only at low temperatures but also under such conditions that the monomers are exposed to elevated temperatures (for instance, about 50°C., particularly 70° – 150°C.) in the distillation and purification processes, etc, and further the polymerization of monomers is inhibited in the portion where monomers condensed from the gaseous phase are present, for instance, column top within the distillation tower, periphery of the cooler or even in the portion where the monomer mist stays. Moreover, despite such strong polymerization inhibiting effects, hexamethylenetetramine substantially does not exhibit the polymerization retarding operation such as is shown by hydroquinone even if it is present in the polymerization system in the case of polymerizing a monomer in the presence of a polymerization initiator. This is one of unexpected, surprising effects in the present invention. Further, hexamethylenetetramine very seldom colors monomers and polymers. Not only that, even when a monomer is present in the organic solvent solution, hexamethylenetetramine sufficiently prevents the polymerization of monomer. Examples of such organic solvents are aliphatic hydrocarbons with 5 – 17 carbon atoms; aromatic hydrocarbons such as benzene, toluene, xylene, ethylbenzene; ethers such as methylethyl ether, ethylbutylether, di-n-propyl ether; ketones such as methylisobutylketone, methylphenylketone, diethylketone, cyclohexanone; aliphatic alcohols with 1–18 carbon atoms; esters such as the ethyl ester of propionic acid; or mixtures thereof.

Furthermore, depending upon the amount of hexamethylenetetramine added, environment of the monomer containing hexamethylenetetramine, is placed such as temperature conditions, time elapsed after addition thereof and type of the solvent present in conjunction with monomer, there are some cases where precipitation of the added hexamethylenetetramine is partially caused from the stabilization monomer solution and it is present in the form of an insoluble portion. Even in such cases, no troubles are caused in the polymerization inhibiting effects of hexamethylenetetramine and it has been observed that the stabilization of monomers can be rather promoted. Accordingly, in accordance with preferable embodiments of the present invention, by causing hexamethylenetetramine to be partially present in the form of the insoluble portion, monomer can be stored stably to the full extent. In the case of polymerizing such monomer, however, in advance of this, it is desirable to separate hexamethylenetetramine present as the insoluble portion. This separation can be accomplished without any difficulty following the usual separation operation of liquids and solids.

As the acrylic acid esters or methacrylic acid esters useful in the present invention, acrylic acid or methacrylic acid alkylesters having 1 – 18 carbon atoms in the alkyl group are suitable. Specific examples of such esters are methyl-, ethyl-, propyl-, butyl, n-octyl-, 2-ethylhexyl, lauryl-, cetyl-, stearyl-ester, etc.

The amount of hexamethylenetetramine added can be suitably selected in conformity with the conditions under which acrylic acid esters or methacrylic acid esters are exposed. In general, it is 0.001 – 3.0 percent by weight, preferably 0.005 – 2.0 percent by weight based on the weight of the monomer. However, as aforesaid, in view of the fact that the presence of the insoluble portion does not cause disadvantages in the stabilization of monomer and brings about rather favorable results, hexamethylenetetramine may be added to the monomer in amounts exceeding 3.0 percent by weight.

Further, in order to enhance the stabilization effects, it is also possible to use the known inhibitors for use with unsaturated monomers in conjunction with hexamethylenetetramine appropriately in conformity with purposes.

The embodiments of the present invention will be explained in accordance with the following non-limitative Examples.

Example 1

Hexamethylenetetramine in the amounts indicated in Table 1 was added to 10.0 g of purified methyl methacrylate and sealed in a glass ampoule and allowed to stand in the constant temperature oil tank maintained at 100°C. Table 1 indicates the condition of changes with the lapse of time in viscosity rise of methyl methacrylate. In the table, by "solidification" it is meant that the entire sample has been solidified by the polymerization of monomer.

The results of Table 1 clearly show that hexamethylenetetramine sufficiently prevents the polymerization of monomers.

Table 1

| Exp. No. | Added amounts of hexamethylenetetramine (weight, ppm) | Viscosity rise |
|---|---|---|
| 1 | No addition | Viscosity rise was observed in 30 minutes and solidification was observed in 1.5 hrs. |
| 2 | 10 | Viscosity slightly rose in 6 hrs and solidification was observed in 12 hrs. |
| 3 | 50 | No viscosity rise was observed 7 hrs later and solidification was observed after 22 hrs. |
| 4 | 100 | Viscosity rise was observed after 20 hours. |

EXAMPLE 2

Compounds in the amounts indicated in Table 2 were added to 10.0 g of purified methyl methacrylate and the sample thus obtained was allowed to stand for 24 hours under the same conditions as in Example 1. Then, after observing the appearance of the sample and viscosity rise, a part of the sample was put into 10 times the volume of the sample of normal hexane to check whether polymer was formed or not. In the table Experiment Nos. 3 – 10 are Comparative Examples.

The results in Table 2 clearly show that of the many compounds hexamethylenetetramine exhibits outstanding effects as a stabilizer for the monomer.

allowed to stand over a period of 24 hours at 100°C. After standing the sample was colorless, transparent and no viscosity rise was observed.

Example 4

0.5 percent by weight of hexamethylenetetramine was added to 10.0 g each of purified 2-ethylhexyl methacrylate and lauryl methacrylate and allowed to stand over a period of 24 hours at 100°C. with the result that each sample was colorless, transparent and no viscosity rise was observed.

Example 5

0.2 percent by weight of hexamethylenetetramine was added to 10.0 g each of purified methyl acrylate, 2-ethylhexyl acrylate and lauryl acrylate and allowed to stand over a period of 24 hours at 100°C. Each sample was colorless, transparent and no viscosity rise was observed.

Example 6

0.05 percent by weight (based on the solution) of hexamethylenetetramine was added to a xylene solution and a light oil solution, each containing 30 percent by weight of purified methyl methacrylate, and allowed to stand for 24 hours at a temperature of 100°C. Each of samples was colorless, transparent and no viscosity rise was observed.

Example 7

200 g of purified methyl methacrylate and 0.1 percent by weight of hexamethylenetetramine were charged into a three neck distillation flask provided with a glass made spherical type cooler and present in conjunction with a cylindrical carbon steel material (in view of practical environmental conditions in industrial apparatus) and heated to a temperature of about 100°C. No polymer was observed when the surface of the internal walls of the cooler was examined 8 hours later. Further, monomer in the flask was also colorless, transparent and no viscosity rise was observed. On the other hand, when the sample experiment was repeated by adding 0.1 percent by weight of hydroquinone, a thin film-like polymer was observed on the internal wall surface at the lower part of the cooler and it was also observed that viscosity of monomer in the flask had risen.

Table 2

| Experiment No. | Added amounts (% by weight) | Condition of samples after 24 hours later | Polymer in normal hexane |
|---|---|---|---|
| 1 | hexamethylenetetramine 0.1 | colorless, transparent, no viscosity rise | Very small amounts of polymer were formed. |
| 2 | hexamethylenetetramine, 2.0 (with the insoluble portion) | colorless, transparent, no viscosity rise | None of polymer were formed. |
| 3 | no addition | solidified in 2 hours | — |
| 4 | hydroquinone, 1.0 | light brown, transparent, rise was observed | Large amounts of polymer formed. |
| 5 | chloranil, 0.1 | became viscous in 18 hours* | Large amounts of polymer formed. |
| 6 | phenol, 0.1 | same as above | Large amounts of polymer formed. |
| 7 | cresol, 0.1 | solidification | — |
| 8 | bisphenol, 0.1 | viscosity rise was observed | Large amounts of polymer formed. |
| 9 | phenothiazine, 0.1 | viscosity rise was observed | Large amounts of polymer formed. |
| 10 | diethylhydroxylamine, 0.1 | Viscosity rise was observed | Large amounts of polymer formed. |

*Solidification had not been finally reached, but the sample had become very viscous.

Example 3

Hexamethylenetetramine (1.0 percent by weight) was added to 10.0 g of purified butyl methacrylate and

Example 8

When each of sample (A) prepared by adding 0.01 percent by weight of hexamethylenetetramine to a mixture of 10 percent by weight to methyl methacrylate and 90 percent by weight of normal hexane, sample (B) prepared by adding thereto 0.01 percent by weight of hydroquinone and sample (C) with no addition was polymerized in the presence of benzoyl peroxide as a catalyst at a temperature of 60°C., the polymerization induction periods of (A) and (C) were almost equivalent and the polymerization yields after a lapse of 20 hours were 42 percent in (A), almost 0 percent in (B) and 46 percent in (C). From this result it can be observed that hexamethylenetetramine shows no substantial polymerization retarding effects with regard to the polymerization of monomers use of a polymerization initiator.

Example 9

Sample (A) prepared by adding 0.01 percent by weight of hexamethylenetetramine to purified methyl methacrylate, sample (B) prepared by adding thereto 0.01 percent by weight of hydroquinone and sample (C) with no addition were polymerized in the presence of azobisisobutyronitrile as a catalyst at a temperature of 60°C. Samples (A) and (C) were each solidified within a period of 3 hours, but in sample (B) viscosity was observed after a lapse of 3 hours, while solidification thereof had not been finally reached.

EXAMPLE 10

Each of solidified product of sample (A) in Example 9, solidified product obtained by allowing sample (B) to stand further and solidified product of sample (C) was dissolved in the ratio of 5.0 g per 100 cc of dimethylformamide, and absorbance was measured at 430 m$\mu$ with the result that it was $2 \times 10^{-3}$ with regard to the solidified product of (A), $9 \times 10^{-3}$ with the solidified product of (B) and O with the solidified product of (C).

This result indicates that in case of hexamethylenetetramine polymerized products are less colored than in the case with hydroquinone.

I claim:

1. A method of preventing the polymerization of a liquid vinyl monomer selected from the group consisting of acrylic acid esters, methacrylic acid esters or mixtures thereof in the absence of a polymerization catalyst while not substantially retarding catalyzed polymerization, which comprises adding to said monomer, as a polymerization inhibitor, hexamethylenetetramine in an amount sufficient to inhibit premature polymerization.

2. The method of claim 1, wherein said vinyl monomer is present in an organic solvent solution.

3. The method of claim 1, wherein said vinyl monomer is exposed to elevated temperatures.

4. The method of claim 1, wherein hexamethylenetetramine is added in an amount of at least 0.001 percent by weight based on the weight of said vinyl monomer.

5. The method of claim 1, wherein hexamethylenetetramine is added in an amount of at least 0.005 percent by weight based on the weight of said vinyl monomer.

6. The method of claim 1, wherein hexamethylenetetramine is added in an amount of 0.001 – 3.0 percent by weight based on the weight of said vinyl monomer.

7. The method of claim 2, wherein said organic solvent is selected from the group consisting of aliphatic hydrocarbons, aromatic hydrocarbons, ketones, esters, ethers, alcohols and mixtures thereof.

8. The method of claim 1, wherein said acid ester is an alkyl acid ester having 1 – 8 carbon atoms in the alkyl group.

* * * * *